Aug. 8, 1961  S. R. OVSHINSKY ET AL  2,995,635
ELECTRIC CONTROL DEVICE
Filed Feb. 24, 1958  3 Sheets-Sheet 2
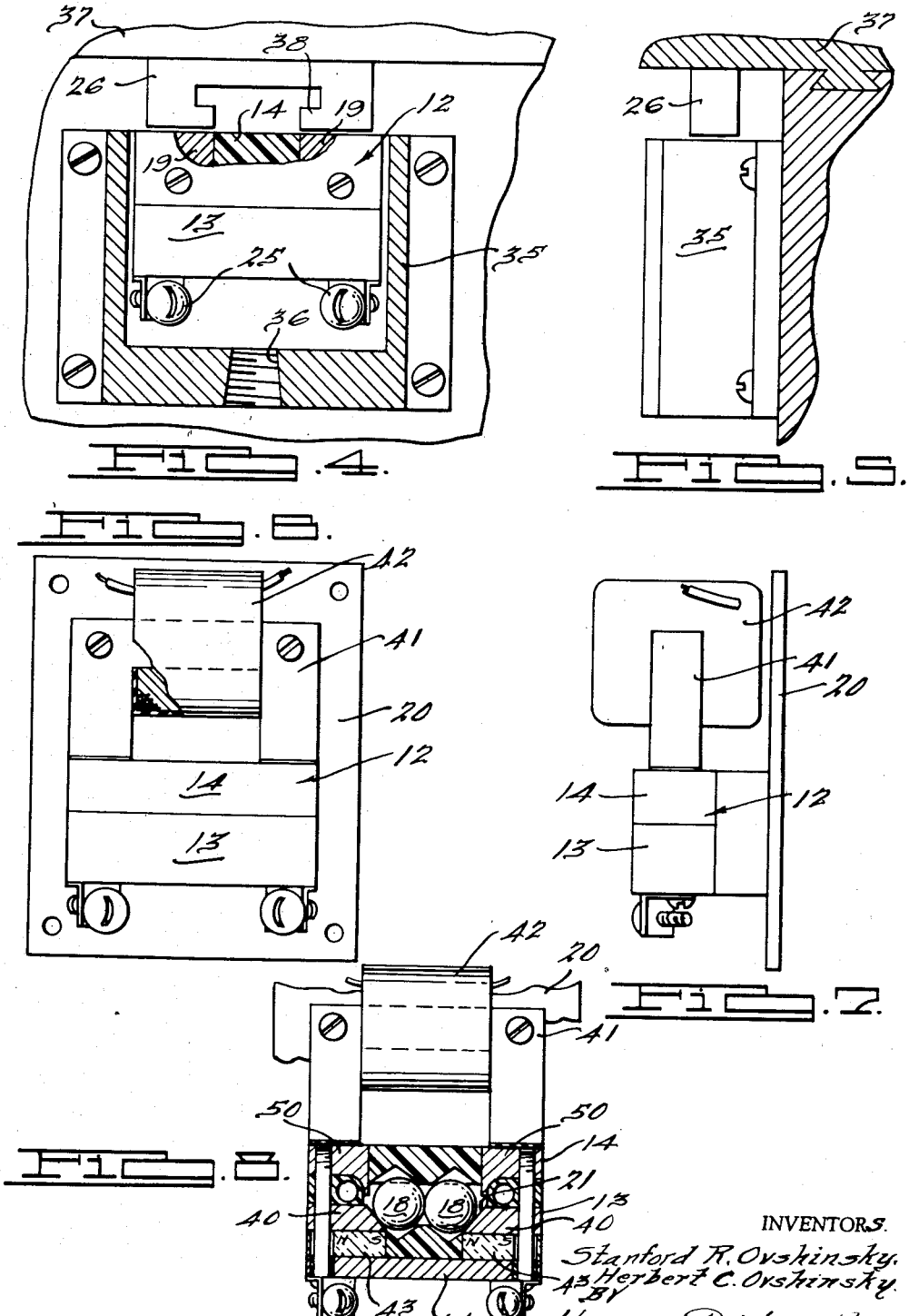
INVENTORS.
Stanford R. Ovshinsky.
Herbert C. Ovshinsky.
BY
Harness, Dickey & Pierce
ATTORNEYS.

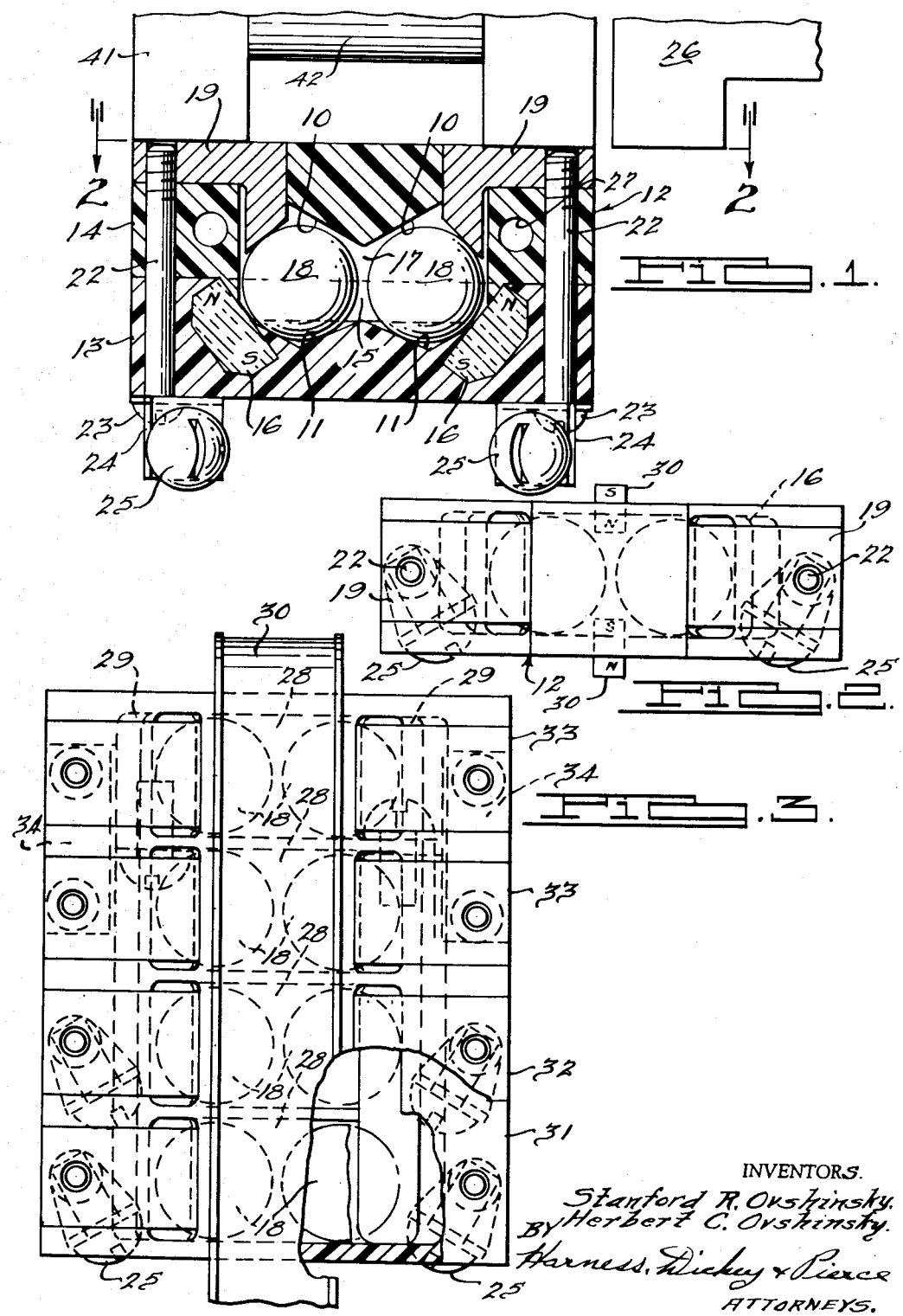

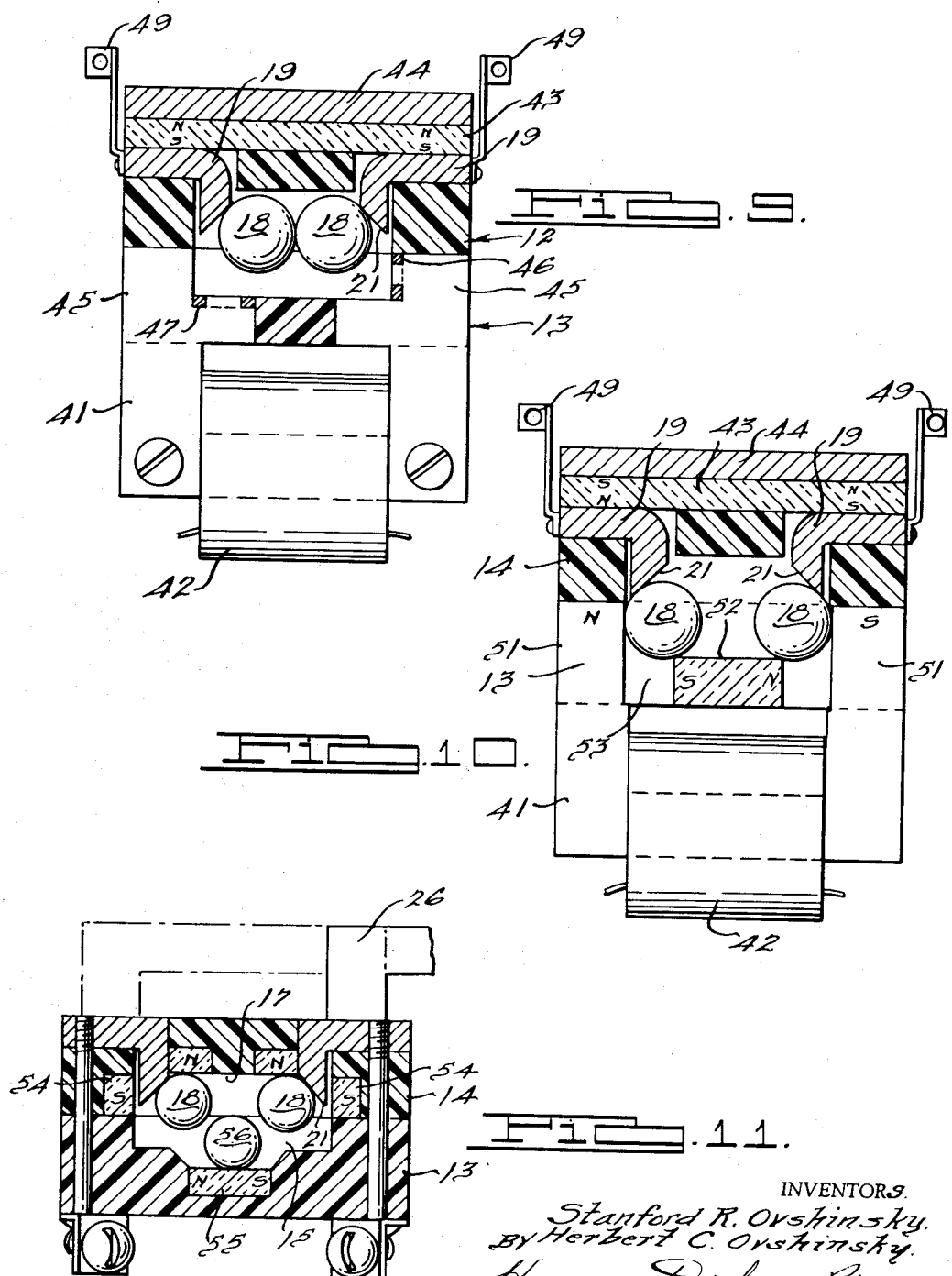

United States Patent Office 2,995,635
Patented Aug. 8, 1961

2,995,635
ELECTRIC CONTROL DEVICE
Stanford R. Ovshinsky, Detroit, and Herbert C. Ovshinsky, Oak Park, Mich., assignors to Tann Corporation, Detroit, Mich., a corporation of Michigan
Filed Feb. 24, 1958, Ser. No. 717,076
14 Claims. (Cl. 200—87)

This invention relates to electric control devices, and particularly to an electric control device which is durable to such a degree as to be substantially indestructible.

In view of the advancement in the electronic field, more and more reliance must be placed on the durability of switching equipment to maintain various appliances and devices in constant operating condition with a minimum of down time. More and more switches are employed in such appliances and devices and more and more chances are present to have the appliances or devices fail due to the failure or malfunction of the switching element or elements.

The control device of the present invention embodies a unit having a housing containing spaced contacts with sloping contact areas which are bridged by a plurality of balls, at least two in number, so mounted that the separation to break a circuit occurs between the balls rather than between the balls and the sloping contact areas. There are no moving parts to the device except for the balls and these are moved by a magnetic flux provided directly by a core and coil unit or by a permanent magnet when relatively moved to be adjacent to the device. The device is so constructed that a ball is maintained in engagement with an associated sloping surface of a contact at all times so that no separation will occur and therefore no arcing at the contact surface will result. Any arcing that may occur will take place on the surface of the balls and since the balls change position each time a circuit is made or broken, the circuits are completed through the engagement of points on the balls which are nearly always new surfaces not damaged by prior arcing. Thus, it is evident that the unit may be employed as a relay, a rectifier, proximity switch, switching elements of various types and the like, and that one or a plurality of the units may be employed, the plurality being mounted directly adjacent to each other and may be connected singly or in multiple, in series, in parallel, in series-parallel, or a combination thereof, and may be utilized as a normally closed contact device or a normally open one, or both.

Accordingly, the main objects of the invention are: to provide a control device having sloping contact surfaces bridged by separable elements which are retained in contact with the sloping surfaces at all times; to provide a control device having sloping contact surfaces each engaged by an individual ball having means for retaining the ball in engagement with the surfaces at all times so that the interruption of a circuit will occur due to the separation of the ball surfaces rather than a ball and a contact surface; to provide a control device having contact elements bridged by a plurality of balls so constructed as to have a normally open or normally closed circuit, the opening of the circuit occurring due to the separation of the surface of the balls; to provide a device having a plurality of elements which are moved into bridging relation with a pair of contacts by the relative movement between the device and a permanent magnet or by the application of a current to a coil mounted on a core associated with the device or by both; to provide a control device of unit construction which may be employed to control many types of circuits through the application of a magnetic field thereto singly or in multiple arrangement, and, in general, to provide a control device for an electric circuit which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is an enlarged sectional view of a control device embodying features of the present invention;

FIG. 2 is a plan view of the device illustrated in FIG. 1;

FIG. 3 is a plan view of a plurality of the devices illustrated in FIG. 2, when constructed as a unit;

FIG. 4 is a sectional view of structure, similar to that illustrated in FIG. 1, when employed as a proximity switch;

FIG. 5 is an end view of the structure illustrated in FIG. 4;

FIG. 6 is a view of structure, similar to that illustrated in FIG. 1, having a U-shaped core and a coil mounted thereon;

FIG. 7 is an end view of the structure illustrated in FIG. 6;

FIG. 8 is a sectional view of the structure illustrated in FIG. 6, showing the normally closed type of device;

FIG. 9 is a view of structure, similar to that illustrated in FIG. 8, with the device also of the normally closed type but controlled by an A.C. circuit;

FIG. 10 is a view of structure, similar to that illustrated in FIG. 9, showing another form thereof, and FIG. 11 is a view of structure, similar to that illustrated in FIG. 1, arranged to have the circuit broken at a plurality of points between a plurality of balls.

Referring to FIGS. 1 to 5, a control device 12 is illustrated which forms a basic unit from which switches, relays, proximity switches, rectifiers and the like are constructed. The unit embodies a two-piece housing 13 and 14, the housing portion 13 being of rectangular shape having a central recess 15 formed to have truncated conical pockets 11 and a pair of permanent magnets 16 in the corners thereof. These magnets may be of any type but preferably are made of Indox, a ceramic material which permits a flux control which locates the separated balls, as herein illustrated. The pockets orient the balls to the same spaced-apart relationship with each other and the terminals 19 so that both will move in the same manner into engagement with each other. The upper housing portion 14 is also rectangular in shape having a recess 17 containing pockets 10 which cooperate with the pockets 11 in the recess 15 to form a central part in the housing. A pair of balls 18 of magnetizable material is movable in the compartment when confined between the pockets. The upper housing portion 14 contains a pair of contact members 19 of conducting magnetic material, having sloping faces 21 in converging or diverging relationship which are disposed at the two upper corners of the recess 17. A pair of screws 22 extend through the housing portions 13 and 14 into threaded apertures in the contacts 19. The heads 23 of the screws 22 secure angle-shaped terminals 24 against the bottom face of the lower housing portion 13. A screw 25 is threaded in each terminal 24 and secures a wire from a circuit in fixed relation thereto.

The balls 18 are maintained in separate relation to each other by the magnets 16 which draw the balls apart so that they are maintained at all times in engagement with the sloping faces 21 of the contact elements 19. When the balls are attracted upwardly toward the top of the housing, they will rotate up the sloping surfaces 21 and will engage each other to complete a circuit through the contact elements and the conductors attached to the terminals 24. This may be accomplished by a magnet 26 when relatively moved adjacent thereto or by a core 41 having a coil 42 thereon which produces the field when the coil is energized. When the permanent magnet 26 is moved away from the device or the coil is de-energized, the magnets 16 will attract the balls outwardly and therefore downwardly to separate the balls and interrupt the circuit. This is done almost instantaneously so that very little arcing, if any, will occur between the separated engaged portions of the ball. It will be noted that the arcing cannot occur on the faces 21 of the terminal since the balls are maintained at all times in contact therewith, providing assurance that the contact between the ball and the terminals will never be defective. While it is possible that the contact between the balls 18 could be defective, it will be noted that the balls are rotated into and out of engagement with each other and that therefore thousands upon thousands of engagements can occur without ever repeating the points of engagement between the surfaces of the two balls, and even if repeated, the chances are that the spots re-engaged were not defective. The circuits will be made and broken through good areas of contact engagement between the balls and the terminals at all times. The fact that there are no moving parts except the two balls stamps the device with indestructibility and a longevity that far exceeds any other type of circuit making and breaking device. In cases where currents are controlled, which might more often produce arcing when the circuit is broken, magnetic means may be employed to provide a field at the point of separation. A pair of permanent magnets 30 is illustrated in FIGS. 1 and 2 by way of example. The arc is drawn outwardly from the points of separation of the balls and becomes elongated and is quickly extinguished before any substantial damage can occur to the ball surface.

The device is a basic unit element which becomes a proximity switch when the magnet 26 is used and a relay when employing the coil 42. These are two of many control devices which can be made up from the basic unit. It will be readily apparent that any number of the devices illustrated in FIG. 2 may be placed side by side, supported in any manner, such as by rods or bolts extending through apertures 27 in the upper housing portion 14 and that such devices so assembled could be employed singly or in series, in parallel, in series-parallel, or in any combination thereof.

In FIG. 3, a single device is made up as a multiple unit, the device being the same as that illustrated in FIGS. 1 and 2, with the exception that the housings 13 and 14 are extended to have four cavities 28 and four sets of balls 18 therein. In this arrangement, a spanning length of magnet 29 of Indox material is employed in the corners of the bottom cavity portion 15 in place of the short sections 16. The two sections 31 and 32 are employed singly while the sections 33 and 34 have the terminals interconnected by angularly disposed plates 34 connecting them in parallel. A coil 30 may be placed over the multiple device to have circuits normally closed or open, or both changed thereby.

In FIGS. 4 and 5, the device 12 is illustrated as being mounted upon a machine within a metal casing 35 which may act as a flux path when of magnetizable material. The case has a threaded aperture 36 to which a conduit is threadably secured which carries conductors of a circuit to the interior of the case. The slide 37 of the machine carries the permanent magnet 26 and produces the operation of the device when moved into proximity thereof. The closing of the circuit through the device in this manner produces the operation of control elements, which reverses the movement of the table 37. The magnet 26 preferably is provided with facing arms 38 at the ends to provide a substantially closed path. As the magnet approaches the device, nothing will occur to actuate the balls until the arms are over the contacts 19, whereupon the path of magnetic flux will include the contacts and balls. This produces the reversal of the table 37 at the exact points in its reciprocal travel at the end of each direction of movement. This same result can be obtained by utilizing the case 35 or employing pole pieces as a shield of permeable metal, or applying a sheath made of such metal to the case. Such a shield or pole piece will prevent the magnetic flux of the magnet 26 from affecting the balls of the device until the magnet is in direct opposite position thereto.

In FIGS. 6, 7 and 8, a device 12 is illustrated mounted on a panel 20 and having a magnetic core 41 and coil 42 secured thereto and insulated therefrom. It will be noted from FIG. 8 that the switch is of the normally closed type with the two balls 18 normally in engagement with each other and the contacts 40. This normally closed position is maintained by a pair of magnets 43 having a north and south pole as illustrated in the figures. This provides a magnetic field through the contacts 40 and balls 18 which closes the circuit and maintains it closed until a magnetic field is applied to the device. Upon the energization of the coil 42 or the movement of a magnet 26 therefrom, the flux will pass from the core 41 through the pole pieces 50 into the opposite sides of the balls and through the contacts 40, the magnets 43 and the keeper plate 44. This draws the balls apart so that the sloping surfaces 21 will cause them to move upwardly to have them separate and break the circuit through the contacts 40. Upon the depletion of the applied magnetic field by the de-energization of the coil 42 or the removal of the magnet 26, the balls will move downwardly toward each other and along the sloping faces 21 of the contacts 40 until they are again in engagement to normally maintain the circuit closed.

In FIG. 9, a device is illustrated for operation primarily on an A.C. circuit. The lower half 13 of the housing has each end provided with a plurality of magnetizable plates 45 which form laminated pole pieces for the A.C. magnetic field. Shading coils 46 and 47 are mounted in opposite legs of the pole pieces at opposite ends of the housing. The magnet 43 maintains the balls 18 in engagement across the sloping faces 21 of the terminals 19 with the magnetizable plate 44 disposed thereabove. The coil 42 is supported on the core 41 or the pole pieces when the plates are combined in unit relation. When A.C. current is passed through the coil 42, the flux in the pole pieces will attract the balls 18 toward the shading coils 46 and 47 and cause them to separate while rolling down the sloping faces 21 of the contact elements 19 without separating therefrom. It will be noted that the flux provided by the coil 42 overcomes that of the magnet 43 and the circuit will remain open so long as the coil 42 is energized. When the coil is de-energized or the flux produced thereby has been reduced a sufficient amount, the flux from the magnet 43 through the magnetizable material of the contacts 19 will draw the balls upwardly along the sloping faces 21 and cause them to be moved into engagement. It will be noted that the attractive force of the applied field will regulate the degree of contact area between the surfaces of the balls with each other and with the sloping faces 21, the greater the force the more pressure of engagement and the greater the area of the contact which will result. This greater force produces a wiping action to the engaged surfaces as they roll together to produce greater contact, permitting more and more current to be carried without heating.

The balls are preferably made of magnetizable material having a low coercive force and may be made of nickel/iron, preferably of a 50/50 ratio of the two elements or a variation of these materials. Proper annealing of this material adds materially to the property of producing the saturation of the ball by a small coercive force and a substantial elimination of the residual forces, which permits the instantaneous breaking of the chains upon the change of magnetism. When only subjected to a small current, the resistivity of the material of the balls will have little effect to the passing of the current. However, when higher currents are employed in the circuit to be controlled by the device, then preferably a coating of good conducting material, such as copper, silver or the like, is applied to the surface of the ball so that a minimum of resistance will be offered to the passage of the current. Such materials are usually softer than the basic magnetizable material and therefore will compress a greater amount in the presence of less force to produce an area rather than a point contact between the engaged surfaces, the area of which will depend upon the strength of the magnetic field moving the balls into engagement. In this arrangement, it will be noted that the contacts 19 are connected to a set of terminals 49 which extend above the plate 44.

A similar structure is illustrated in FIG. 10, wherein a plurality of laminations are disposed at each end of the lower half 13 of the housing forming pole pieces 51 between which a permanent magnet 52 is located at the bottom of the central recess 53. The balls 18 are normally in engaged position, as illustrated in FIG. 9, to normally maintain the circuit closed. The circiut is broken when the balls are moved downwardly and outwardly by the flux introduced in the core 41 and pole pieces 51 by the coil 42 when the latter is energized. The north and south pole arrangement and the space between the pole pieces 51 and magnet 52 draw the balls 18 downwardly along the sloping faces 20 of the contacts 19 to separate them a substantial amount, as illustrated in the figure. When the current to the coil 42 is cut off, the balls 18 will be drawn upwardly by the flux from the magnet 43, to thereby complete the circuit with the balls in engagement as illustrated in FIG. 9.

In FIG. 10 a still further form of the invention is illustrated, that wherein magnets 54 are provided at opposite ends of the cavity 17 in the housing portion 14 and a single central magnet 55 is mounted in the lower housing section 13. An additional ball 56 is disposed within the cavity formed by the recesses 15 and 17 in the two housing portions. The arrangement produces two points of separation between the balls 18 and 56 and thereby further reduces the possibility of damage to the surface of the balls. The balls 18 are maintained on the sloping surfaces 21 of the contacts 19 at all times, while the ball 56 either bridges the balls 18 or is separated therefrom, maintained in the central portion of the recess 15 by the magnet 55. The balls 18 are herein illustrated as being drawn outwardly and downwardly by the flux from the magnets when not under the influence of the magnetic field of the coil 42 or permanent magnet 26. When, however, the balls are subjected to the field flux from the coil 42 or the magnet 26, then the balls 18 will be drawn upwardly while maintained in engagement with the sloping faces 21 and will be bridged by the ball 56 which will be drawn upwardly by the field passing through the balls 18, overcoming the force of the magnet 55 to thereby complete the circuit. When breaking the circuit, the ball 56 will drop from the balls 18 as all of the balls move downwardly to break the circuit at the two points of separation between the balls 18 and the ball 56, the ball 18 remaining in engagement with the sloping surfaces 21 of the contacts 19.

The balls 18, as well as the ball 56, will reorient themselves each time they are moved to or from engaged position and the different points of engagement will multiply many times because of the use of three balls instead of two, as above described. The surfaces of the three balls, for a like reason, will be subjected to less damage. It is to be understood that the device may be made gas and liquid tight, either by sealing the case 35 thereabout or by sealing the housing portions to permit an inert gas or a dielectric fluid to be retained within the cavity. This gas or fluid prevents damage to the surface of the balls due to the making and breaking of the circuits thereat. Such a gas or fluid is illustrated by way of example at 57 in the recess of the switch 12 illustrated in FIG. 8. It is to be understood that the coil 42 and permanent magnet 26 are interchangeable so that one may be substituted for the other in the various examples shown and that both may be employed to require two signals to be present to change the position of the balls. The field produced by the coil or magnet polarizes the pole pieces, balls and/or holding magnets in a manner to cause the movement of the balls. By polarizing the flux path in the opposite sense to the normal path, the circuit to the device is either made or broken. It is to be understood that the same or similar effect can be obtained by applying a potential to the balls to produce charges thereon and on the contacts to cause the balls to attract or repel each other to make and break the circuit in the manner above described. A potential and a magnetic flux may both be employed in the device, the arrangement being shown in the copending application of S. R. Ovshinsky, Serial No. 694,890, filed November 6, 1957, and assigned to the assignee of the present invention.

What is claimed is:

1. In a control device, a housing having a cavity, spaced contacts having sloping faces within the cavity, a pair of balls within the cavity one for each said face, and a pair of magnets, one for each side of the cavity for retaining a ball in engagement with an associated contact face at all times.

2. In a control device, a housing, a pair of terminals having contact faces, a pair of magnetically actuatable balls in constant engagement with its associated contact face at all times while permitting the balls to move into and out of engagement with each other, and means for moving said balls into engaged and disengaged positions for controlling a circuit through said contacts without breaking a circuit thereat.

3. In a control device, a housing having a cavity, spaced contacts in said cavity having contact faces, a pair of balls in said cavity engaging said contact faces and each other, and means for moving said balls along said contact faces while retained in conducting relation therewith to produce the interruption of the circuit at the point of separation of the balls, the moving means for said balls being a magnet.

4. In a control device, a housing having a cavity, spaced contacts in said cavity having sloping faces, a pair of balls in said cavity engaging said faces and each other, and means for moving said balls along said diverging sloping faces while retained in conducting relation therewith to produce the interruption of the circuit at the point of separation of the balls without interrupting the contact between the balls and said sloping faces, the moving means for said balls being an energizable coil.

5. In a control device, a housing having a central cavity, contacts within said cavity, a pair of magnetically actuatable balls in said cavity in engagement with said contacts, and means for moving said balls into engaged and disengaged positions while maintained in engagement with said contacts for controlling a circuit connected to the terminals, said means applying a greater force to produce a greater area of engagement between the balls and the contacts when heavier currents are to be carried.

6. In a control device, a housing having a central cavity, contacts within said cavity, a pair of magnetically actuatable balls in said cavity in engagement with said contacts, and means for moving said balls into engaged and disengaged positions while maintained in engagement with said contacts for controlling a circuit connected to the terminals, said means being a permanent magnet having aligned arms for closing the field until moved across said contacts when the flux passes through said contacts to move said ball at the same position at the beginning of each operation.

7. In a control device, a housing having a cavity, a pair of contacts within the cavity having sloping faces, a plurality of magnetically actuatable balls within the cavity capable of bridging the contacts, and magnetic means for retaining the balls in engagement with the sloping faces when moved into and out of engagement with each other.

8. In a control device, a housing having a cavity, a pair of contacts within the cavity having sloping faces, a plurality of balls within the cavity capable of bridging the contacts, means for retaining the balls in engagement with the sloping faces when moved into and out of engagement with each other, said means embodying laminated pole pieces and a coil for producing a polarized field when energized from an A.C. source, and means changing the polarity of the field to change the position of the balls.

9. In a circuit control device of the normally closed type, a housing, terminals extending in the housing having sloping faces disposed in converging relationship, a pair of balls within the housing in egagement with said sloping faces, pole pieces made up of laminations for drawing said balls downwardly and outwardly into separated relationship while retaining them in engagement with said sloping faces at all times, a permanent magnet between said pole pieces to assist in the movement of the balls toward such pole pieces, and a magnet adjacent to said contacts for moving said balls up the sloping faces into engagement with each other when the said pole pieces are demagnetized.

10. In a circuit control device of the normally closed type, a housing, terminals extending in the housing having sloping faces disposed in converging relationship, a pair of balls within the housing in engagement with said sloping faces, pole pieces made up of laminations for drawing said balls downwardly and outwardly into separated relationship while retaining them in engagement with said sloping faces at all times, a permanent magnet between said pole pieces to assist in the movement of the balls toward such pole pieces, a magnet adjacent to said contacts for moving said balls up the sloping faces into engagement with each other when the said pole pieces are demagnetized, and a keeper plate adjacent to said magnet for strengthening the flux path for drawing the balls into engaged position and maintaining the circuit normally closed.

11. In a control device, a housing having a cavity, a pair of spaced contacts in said cavity having sloping faces in converging relationship to each other, a plurality of balls within said cavity, means for maintaining two of said balls in contact with the sloping faces at all times, and means for attracting all of said balls into a position of engagement with each other to thereby complete a circuit across said contacts.

12. In a control device, a housing having a central cavity, a pair of terminals in said cavity having sloping faces in diverging relationship to each other, a plurality of balls in said cavity, means for maintaining the balls which are adjacent to the sloping faces in engagement therewith at all times, means for moving said balls into engagement with each other, and means for separating said balls and maintaining them in separated relationship while each adjacent ball maintains engagement with its associated sloping face.

13. In a control device, a housing having a central cavity, a pair of terminals in said cavity having sloping faces in diverging relationship to each other, a plurality of balls in said cavity, means for maintaining the balls which are adjacent to the sloping faces in engagement therewith at all times, means for moving said balls into engagement with each other, means for separating said balls and maintaining them in separated relationship while each adjacent ball maintains engagement with its associated sloping face, a plurality of said units being secured together, and a coil encompassing said units to change the position of the balls simultaneously.

14. In a control device, a housing having a central cavity, a pair of terminals in said cavity having sloping faces in diverging relationship to each other, a plurality of balls in said cavity, means for maintaining the balls which are adjacent to the sloping faces in engagement therewith at all times, means for moving said balls into engagement with each other, means for separating said balls and maintaining them in separated relationship while each adjacent ball maintains engagement with its associated sloping face, and an insulating medium within the cavity about said balls and sloping contact faces.

References Cited in the file of this patent

UNITED STATES PATENTS

| | | |
|---|---|---|
| 684,378 | Potter | Oct. 8, 1901 |
| 1,169,475 | Finnigan | Jan. 25, 1916 |
| 2,015,156 | Richmond | Sept. 24, 1935 |
| 2,618,718 | Duffing et al. | Nov. 18, 1952 |
| 2,716,168 | Shonka | Aug. 23, 1955 |
| 2,732,464 | Ohl | Jan. 24, 1956 |
| 2,794,178 | Reynolds | May 28, 1957 |
| 2,836,673 | Reynolds | May 27, 1958 |